US006856720B2

(12) United States Patent
Baugh

(10) Patent No.: US 6,856,720 B2
(45) Date of Patent: Feb. 15, 2005

(54) ROTATING FIBER OPTIC SWITCH

(75) Inventor: James C. Baugh, Norcross, GA (US)

(73) Assignee: Photonic Concepts, Inc., Norcross, GA (US)

( * ) Notice: Subject to any disclaimer, the term of this patent is extended or adjusted under 35 U.S.C. 154(b) by 167 days.

(21) Appl. No.: 10/247,968

(22) Filed: Sep. 20, 2002

(65) Prior Publication Data

US 2004/0057659 A1 Mar. 25, 2004

(51) Int. Cl.[7] .................................................. G02B 6/26
(52) U.S. Cl. ............................. 385/22; 385/18; 385/19
(58) Field of Search ............................. 385/16, 18, 19, 385/22, 25, 26, 31, 32, 36

(56) References Cited

U.S. PATENT DOCUMENTS

| | | | | |
|---|---|---|---|---|
| 4,378,144 A | * | 3/1983 | Duck et al. ................... 385/16 |
| 4,470,662 A | * | 9/1984 | Mumzhiu ..................... 385/19 |
| 6,009,219 A | * | 12/1999 | Doyle ........................... 385/23 |
| 6,275,626 B1 | * | 8/2001 | Laor ............................ 385/18 |

* cited by examiner

Primary Examiner—Edward J. Glick
Assistant Examiner—Thomas R Artman
(74) Attorney, Agent, or Firm—Bryan W. Bockhop; Arnall Golden Gregory LLP

(57) ABSTRACT

A switch for optically coupling a first optical channel to a selected one of a plurality of second optical channels includes a frame that defines a central passage, through which a beam coupled to the first optical channel may pass, and a plurality of peripheral passages, through which a beam coupled to a selected second optical channel may pass. A rotational object is capable of rotating about an axis. A beam redirector allows a first optical path to be optically coupled to a second optical path extending from a preselected position adjacent the peripheral area of the rotational object. A turning mechanism causes the rotational object to rotate to a position where the second optical path is in alignment with the selected one of the plurality of second optical channels.

13 Claims, 3 Drawing Sheets

ROTATING FIBER OPTIC SWITCH

BACKGROUND OF THE INVENTION

1. Field of the Invention

The present invention relates to optical communication systems and, more particularly, to a switch for optically coupling a first optical channel to a selected one of a plurality of second optical channels.

2. Description of the Prior Art

Optical communications systems are quickly becoming the standard for high speed data communications. Optical communications systems employ optical channels, such as fiber optics, to transmit a signal from one of a plurality of transmitters to any one of a plurality of receivers.

An optical switch is typically used to couple a selected transmitter to a selected receiver. Typical optical switches include a hierarchy of "1-by-2" switches that allow a first optical fiber to be coupled to a selected one of two other optical fibers. Each 1-by-2 switch typically includes moving parts that make the hierarchy of switches both costly and mechanically complex. Another type of switch involves a mechanical arm upon which is mounted a first optical fiber that can be juxtaposed with a selective one of a plurality of second optical fibers. Such a switch, which is sometimes referred to as a "one-to-many switch," or a "1×n" switch, typically is susceptible to shock damage, placing it out of alignment.

Therefore, there is a need for a one-to-many optical switch that is mechanically simple and reliable.

SUMMARY OF THE INVENTION

The disadvantages of the prior art are overcome by the present invention which, in one aspect, is a switch for optically coupling a first optical channel to a selected one of a plurality of second optical channels. A frame defines a central passage through which a beam coupled to the first optical channel may pass. The frame also defines a plurality of peripheral passages through which a beam coupled to a selected second optical channel may pass. Each of the peripheral passages is in substantial alignment with a corresponding second optical channel of the plurality of second optical channels. A rotational object, having a top surface and a peripheral area, is disposed coaxially with the frame. The rotational object has an axis that is substantially in alignment with the central passage. The rotational object is capable of rotating about the axis. A beam redirector that is affixed to the top surface of the rotational object allows a first optical path, in alignment with the first optical channel, to be optically coupled to a second optical path, extending from a preselected position adjacent the peripheral area of the rotational object. A turning mechanism causes the rotational object to rotate to a position where the second optical path is in alignment with the selected one of the plurality of second optical channels.

In another aspect, the invention is a switch for optically coupling a first optical fiber to a selected one of a plurality of second optical fibers. A frame defines a central passage through which a beam coupled to the first optical fiber may pass along a first optical path. The frame also defines a plurality of peripheral vertical passages through which a beam coupled to a selected second optical fiber may pass. Each of the peripheral passages is in substantial alignment with a corresponding second optical fiber of the plurality of second optical fibers and each of the second optical fibers is disposed along a circular path adjacent a peripheral portion of the frame. A cylindrical rotational object, having a top surface and a peripheral area, is disposed coaxially with the frame. The rotational object has an axis that is substantially in alignment with the central passage and is capable of rotating about the axis. A first mirror is disposed on the top surface of the rotational object in alignment with the axis so as to place the first optical fiber in optical communication with a third optical path that is not parallel to the first optical path. A second mirror is disposed on the top surface of the rotational object adjacent the peripheral area so as to place the third optical path in optical communication with a second optical path. The first optical path is parallel to the second optical path and the third optical path is at a right angle to both the first optical path and the second optical path, thereby allowing the first optical path in alignment with the first optical fiber to be optically coupled to a second optical path. A servo motor causes the rotational object to rotate to a position where the second optical path is in alignment with the selected one of the plurality of second optical fibers. A casing encloses the a frame, the rotational object, the beam redirector and the turning mechanism.

In yet another aspect, the invention is a method of optically coupling a first optical channel to a selected one of a plurality of second optical channels. A second optical path is aligned with the selected one of the plurality of second optical channels. A beam, traveling in a first direction, is received along a first optical path that is in alignment with the first optical channel. The beam is redirected to the second optical path. The second optical path is parallel to and spaced apart from the first optical path, so that the beam in the first optical path travels in a second direction that is opposite the first direction and so that the beam travels through the selected one of the plurality of second optical channels.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
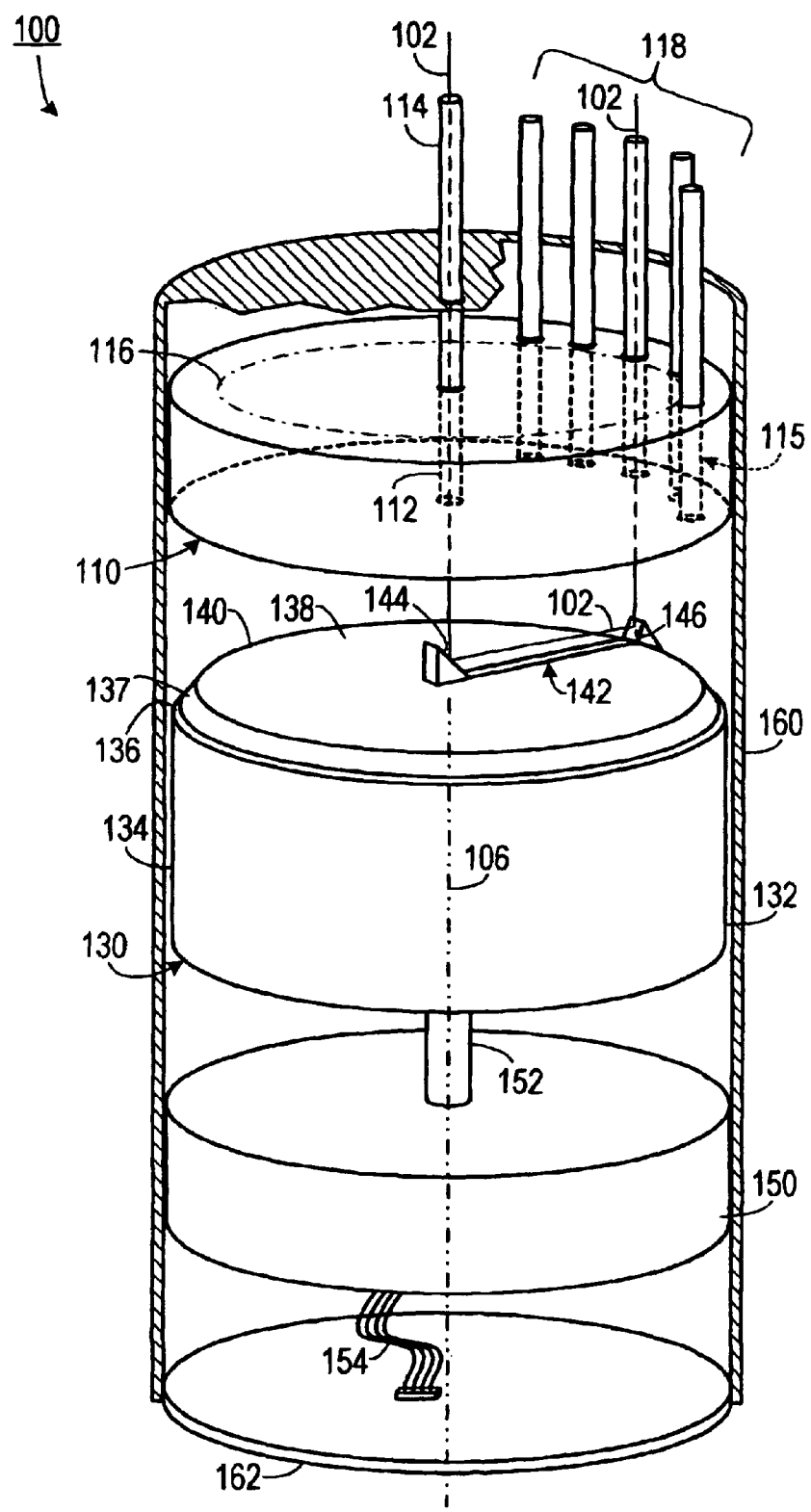
FIG. 1 is a top front view of one illustrative embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Unless stated otherwise, the drawings are not necessarily drawn to scale.

As shown in FIG. 1, one illustrative embodiment of the invention includes a switch 100 for optically coupling a first optical channel 114, which could be embodied as an optical fiber, to a selected one of a plurality of second optical channels 118, which could also be embodied as optical fibers. The optical channels 114 and 118 can be made from a material that would allow passage of an optical beam 102 therethrough. The switch 100 includes a frame 110 that has a central passage 112 through which the first optical channel 114 passes. The first optical channel 114 would typically terminate in a collimating lens (e.g., if the optical channel were an optical fiber, the collimating lens could be formed by the terminal surface of the fiber). The frame 110 also defines a plurality of peripheral passages 115, disposed along a circular path 116, through which the plurality of second optical channels 118 pass.

The switch 100 also includes a rotational object 130 that, in one embodiment is a cylinder 132 having an outer wall 134 terminating in a top edge 136, and a top surface 138 terminating in an outer edge 140. The rotational object 130 is substantially coaxial with the frame 110 and has an axis 106 that is substantially in alignment with the central passage 112.

Figure 2:
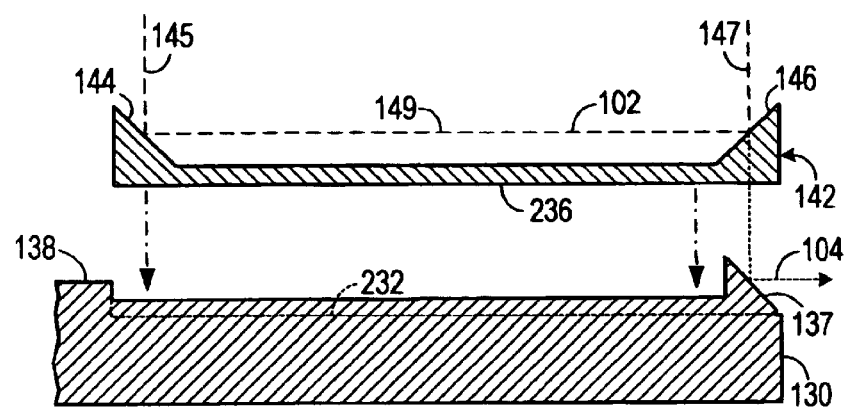
FIG. 2 is an exploded cross-sectional view of a mirror unit and a portion of a rotational object.

A beam redirector 142 is affixed to the top surface 138 of the rotational object 130. As shown in greater detail in FIG. 2, in one embodiment, the beam redirector 142 includes an elongated member 236 that terminates in a first mirror 144 and an opposite second mirror 146. The first mirror 144 and the second mirror 146 each have an angle, relative to the elongated member 236, so that a beam 102 traveling along a first optical path 145 is reflected onto a third optical path 149 and then onto a second optical path 147. Similarly, a beam 102 traveling along the second optical path 147 is reflected onto the third optical path 149 and onto the first optical path 145. Thus the invention allows for bi-directional communications. In this embodiment, the beam redirector 142 may be manufactured as a single unit and then placed in a channel 232 that is milled in the top surface 138 of the rotational object 130. The beam redirector may be made from a rigid plastic such as Delrin®, with the reflective surfaces of the mirrors 144 and 146 being formed by applying a reflective material, such as gold, to the mirror surfaces.

Returning to FIG. 1, the first mirror 144 is aligned with the first central passage 112 and is rotatable about the axis 106 so that the second mirror 146 may be aligned with a selected one of the plurality of peripheral passages 115 so as to optically couple the first optical channel 114 to a selected one of the second optical channels 118.

The top edge 136 is connected to the outer edge 140 with a peripheral area 137 that forms a tapered surface. This causes a beam received from any of the second optical channels 118 that is not aligned with the second mirror 146 to be deflected away from the peripheral passages 115, thereby preventing undesirable cross-talk between the second optical channels 118. In one embodiment, the taped surface of the peripheral area 137 deviates from the top surface 138 at an angle of 46°. Returning to FIG. 2, any beam 104 not reflected by the second mirror 146 is deflected away from the optical channels so as to be absorbed.

Returning to FIG. 1, the frame 110 and the rotational object 130 may be made from Delrin®, which is a dark, optically absorptive material. When using a rigid plastic, the components should be roughed out and then allowed to relax for about seven days prior to the final milling. It is understood that the components of the invention may be made from many other materials (e.g., anodized aluminum).

The position of the rotational object 130 is controlled by a turning mechanism 150, such as a controllable servo-motor coupled to the rotational object 130 by an armature 152. The servo-motor is controlled electronically through control cable 154.

A casing 160 encloses the a frame 110, the rotational object 130, the beam redirector 142 and the turning mechanism 150. The interior of the casing 160 should be dark and matte to prevent noise from misdirected beams. The casing 160 is sealed at the bottom by a base 162.

Figure 3A:
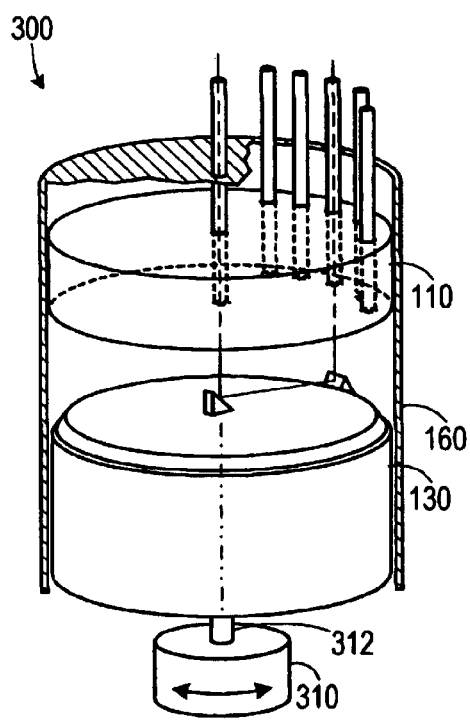
FIG. 3A is a cut-away perspective view of a manual embodiment of the invention.
Figure 3B:
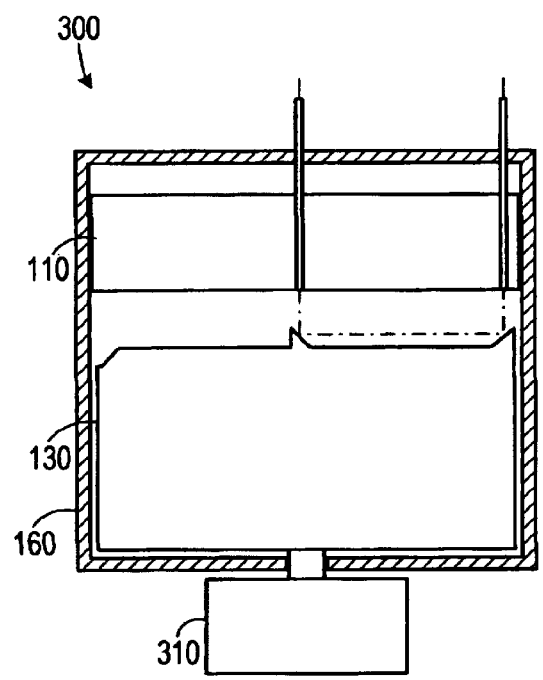
FIG. 3B is a cross-sectional view of the embodiment shown in FIG. 3A.

As shown in FIGS. 3A and 3B, the switch 300 may employ a manual turning mechanism 310 that could be embodied as a knob attached to the rotational object via a shaft 312. Such an embodiment could be used by technicians in the field.

Figure 4:
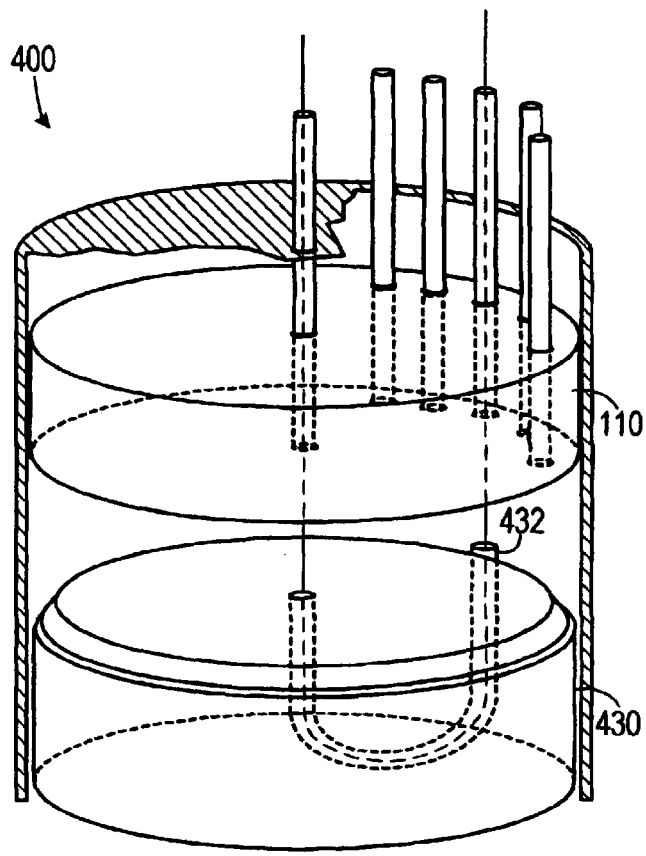
FIG. 4 is a view of an alternative embodiment of the invention.
Figure 5:
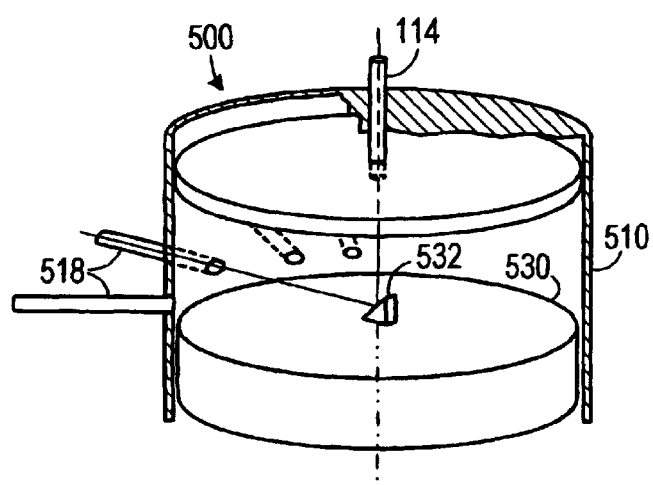
FIG. 5 is a view of an alternative embodiment of the invention.

As shown in FIG. 4, the beam redirector 432 could be embodied as an optical fiber either embedded in, or supported by, the rotational object 430. In FIG. 5, the beam redirector could be embodied as a single mirror 532 mounted on the rotational object 530 if the plurality of second optical channels 518 is arrayed radially about the switch 500. In this case, the frame 510 would also serve as a casing.

While the invention need not necessarily be configured cylindrically, as shown in the above embodiments, a cylindrical provides an advantage of easy stacking and packing. With a cylindrical embodiment, the number of the plurality of peripheral optical channels that may be used is a function of the circumference of the frame and the diameter of the optical channels. Therefore, increasing the number of peripheral optical channels may be accomplished in the design phase by increasing the diameter (and thus the circumference) of the frame and the rotational object.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A switch for optically coupling a first optical channel to a selected one of a plurality of second optical channels, comprising:

a. a frame that defines a central passage through which a beam coupled to the first optical channel may pass and that defines a plurality of peripheral passages through which a beam coupled to a selected second optical channel may pass, each of the peripheral passages in substantial alignment with a corresponding second optical channel of the plurality of second optical channels;

b. a rotational object, having a top surface and a peripheral area, disposed coaxially with the frame, the rotational object having an axis that is substantially in alignment with the central passage, the rotational object capable of rotating about the axis and including a cylinder including an outer wall having a top edge, the top surface including an outer edge, wherein the peripheral area comprises a tapered surface that connects the top edge of the cylinder with the outer edge of the top surface;

c. a beam redirector, affixed to the top surface of the rotational object, that allows a first optical path in alignment with the first optical channel to be optically coupled to a second optical path extending from a preselected position adjacent the peripheral area of the rotational object; and d. a turning mechanism that causes the rotational object to rotate to a position where the second optical path is in alignment with the selected one of the plurality of second optical channels.

2. The switch of claim 1, further comprising a casing that encloses the frame, the rotational object, the beam redirector and the turning mechanism.

3. The switch of claim 1, wherein each of the second optical channels is disposed along a circular path adjacent a peripheral portion of the frame.

4. The switch of claim 1, wherein the first optical channel comprises an optical fiber.

5. The switch of claim 1, wherein the second optical channel comprises an optical fiber.

6. The switch of claim 1, wherein the tapered surface tapers from the top surface at an angle of 46°.

7. The switch of claim 1, wherein the redirector comprises:

a. a first mirror disposed on the top surface of the rotational object in alignment with the axis so as to place the first optical channel in optical communication with a third optical path that is not parallel to the first optical path; and b. a second mirror disposed on the top surface of the rotational object adjacent the peripheral area so as to place the third optical path in optical communication with the second optical path.

8. The switch of claim 7, wherein the first optical path is parallel to the second optical path and wherein the third optical path is at a right angle to both the first optical path and the second optical path.

9. The switch of claim 1, wherein the redirector comprises an optical fiber.

10. The switch of claim 1, wherein the turning mechanism comprises a servo motor.

11. The switch of claim 1, wherein the turning mechanism comprises a manual turning device affixed to the rotational object.

12. A switch for optically coupling a first optical fiber to a selected one of a plurality of second optical fibers, comprising a. a frame that defines a central passage through which a beam coupled to the first optical fiber may pass alone a first optical path and that defines a plurality of peripheral vertical passages through which a beam coupled to a selected second optical fiber may pass, each of the peripheral passages in substantial alignment with a corresponding second optical fiber of the plurality of second optical fibers, each of the second optical fibers disposed along a circular path adjacent a peripheral portion of the frame;

b. a cylindrical rotational object, having a top surface and a peripheral area, disposed coaxially with the frame, the rotational object having an axis that is substantially in alignment with the central passage, the rotational object capable of rotating about the axis, the rotational object including a cylinder including an outer wall having a top edge, the top surface including an outer edge, wherein the peripheral area includes a tapered surface that connects the top edge of the cylinder with the outer edge of the top surface:

c. a first mirror disposed on the top surface of the rotational object in alignment with the axis so as to place the first optical fiber in optical communication with a third optical path that is not parallel to the first optical path;

d. a second mirror disposed on the top surface of the rotational object adjacent the peripheral area so as to place the third optical path in optical communication with a second optical path, the first optical path being parallel to the second optical path and the third optical path being at a right angle to both the first optical path and the second optical path, thereby allowing the first optical path in alignment with the first optical fiber to be optically coupled to a second optical path; and e. a servo motor that causes the rotational object to rotate to a position where the second optical path is in alignment with the selected one of the plurality of second optical fibers; and f. a casing that encloses the a frame, the rotational object, the beam redirector and the turning mechanism.

13. The switch of claim 12, wherein the tapered surface tapers from the top surface at an angle of 46°.

* * * * *